(12) United States Patent
Medeiros (10) Patent No.: US 7,836,556 B1
(45) Date of Patent: Nov. 23, 2010

(54) MOTORCYCLE BATTERY CARRYING APPARATUS

(76) Inventor: Mark A. Medeiros, 137 Field St., New Bedford, MA (US) 02740

( * ) Notice: Subject to any disclaimer, the term of this patent is extended or adjusted under 35 U.S.C. 154(b) by 326 days.

(21) Appl. No.: 12/132,413

(22) Filed: Jun. 3, 2008

(51) Int. Cl.
H01M 2/10 (2006.01)
(52) U.S. Cl. .................................................... 16/423
(58) Field of Classification Search ............... 16/423, 16/422, 425, DIG. 15, DIG. 24–DIG. 25; 429/187, 100; 294/903, 169, 137, 145; 24/301, 24/302
See application file for complete search history.

(56) References Cited

U.S. PATENT DOCUMENTS

| | | | | |
|---|---|---|---|---|
| 1,461,995 A | * | 7/1923 | Young | 294/169 |
| 1,938,158 A | * | 12/1933 | Steele | 294/92 |
| 2,157,753 A | * | 5/1939 | Gantt | 294/99.1 |
| 2,234,589 A | * | 3/1941 | Dyer | 294/103.1 |
| 2,277,976 A | * | 3/1942 | Helmenstine | 294/103.1 |
| 2,503,794 A | * | 4/1950 | Brown | 294/104 |
| 3,248,144 A | * | 4/1966 | Hinds | 294/16 |
| 3,865,419 A | * | 2/1975 | Bowers et al. | 294/92 |
| 4,013,819 A | * | 3/1977 | Grabb | 429/187 |
| 4,448,863 A | * | 5/1984 | Terrell | 429/178 |
| 4,632,888 A | | 12/1986 | Kump et al. | |
| 5,184,862 A | * | 2/1993 | Theobald | 294/145 |
| 5,242,769 A | | 9/1993 | Cole et al. | |
| 5,440,785 A | | 8/1995 | McDonald | |
| 5,670,274 A | * | 9/1997 | Forrer | 429/187 |
| 6,499,190 B2 | * | 12/2002 | Ruiz Rodriguez | 16/423 |

* cited by examiner

Primary Examiner—Chuck Y. Mah
(74) Attorney, Agent, or Firm—Crossley Patent Law; Mark A. Crossley (57) ABSTRACT

The motorcycle battery carrying apparatus provides for the unique demands of handling, installing, and removing motorcycle batteries and batteries in other personally-sized vehicles which are equipped with motorcycle type batteries. The apparatus handles such batteries without extending beyond the dimensions of existing batteries, excepting above. Provided in both rigid and pliable handle embodiments, the apparatus attaches to the same terminals as do the battery cables of the vehicle. By attaching to the terminals of the battery without extending beyond the width or depth of the battery, the apparatus is assured of fitting the battery within existing tolerances. Dependant upon the given application and desire, the apparatus can remain on the battery or be removed and used repeatedly.

17 Claims, 8 Drawing Sheets

MOTORCYCLE BATTERY CARRYING APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

The advantages of battery carrying devices are well known in the art. Battery weight, close tight quarters in which batteries must fit, and the carrying of batteries often create difficulties. This is as true of motorcycle batteries as it is of automobile batteries. Motorcycle batteries, however, are faced with unique mounting points and with even more closely confined space considerations than many automobile and truck batteries. Installing and removing a motorcycle battery is fraught with mashed fingers, dropped batteries, and related difficulties. Moreover, motorcycle batteries have battery cable mounts that differ from those of automobiles. Motorcycle battery cable mounts do not extend beyond the dimensions of the battery case. Currently known battery carriers and battery/handle combinations used with automobiles cannot serve the motorcycle industry. The present apparatus provides solutions for handling, installation, and removal of motorcycle batteries.

FIELD OF THE INVENTION

The motorcycle battery carrying apparatus relates to battery carrying handles and more especially to a motorcycle battery carrying apparatus.

DESCRIPTION OF THE PRIOR ART

Prior related art U.S. Pat. No. 4,632,888 issued to Kump et al. on 1986 Dec. 30 teaches a battery carrying handle that is integrated into a specific cover for handle fit. As a handle/battery package, this device designed for automotive batteries cannot solve the problems of motorcycle battery carrying for any given motorcycle battery, as can the present apparatus. U.S. Pat. No. 5,242,769 issued to Cole et al. on 1993 Sep. 7 teaches a battery carrying handle and accompanying battery design which resembles the above-noted patent to Kump et al. device in that the handle and battery are a package. The handle cannot stand alone as does the present apparatus and cannot serve motorcycle needs. Further, such a package cannot fit within the confines of most motorcycle batteries. U.S. Pat. No. 5,440,785 issued to McDonald on 1995 Aug. 15 teaches a battery handle assembly which cooperates with a case design. Like the above-noted patents, the handle is not stand alone. The relative increased end dimensions of the handle and battery case cannot meet the confined restrictions of the battery housings of most motorcycle batteries.

While the above-described devices fulfill their respective and particular objects and requirements, they do not describe a motorcycle battery carrying apparatus that provides for the advantages of the present motorcycle battery carrying apparatus. In this respect, the present motorcycle battery carrying apparatus substantially departs from the conventional concepts and designs of the prior art. Therefore, a need exists for an improved motorcycle battery carrying apparatus.

SUMMARY OF THE INVENTION

The general purpose of the motorcycle battery carrying apparatus, described subsequently in greater detail, is to provide a motorcycle battery carrying apparatus which has many novel features that result in an improved motorcycle battery carrying apparatus which is not anticipated, rendered obvious, suggested, or even implied by prior art, either alone or in combination thereof.

To attain this, the motorcycle battery carrying apparatus provides for the unique demands of handling, installing, and removing motorcycle batteries and batteries in other personally sized vehicles which are equipped with motorcycle type batteries. The apparatus handles such batteries without extending beyond the dimensions of the battery, excepting above. The apparatus is provided in both rigid and pliable handle embodiments, as needed. The apparatus attaches to the same terminals as do the battery terminals of the vehicle. The apparatus is attached to the tops of the terminals. By attaching to the terminals of the battery without extending beyond the width or depth of the battery, the apparatus is assured of fitting the battery within existing tolerances. Dependant upon the given application and desire, the apparatus can remain on the battery or be removed and used repeatedly.

Thus has been broadly outlined the more important features of the improved motorcycle battery carrying apparatus so that the detailed description thereof that follows may be better understood and in order that the present contribution to the art may be better appreciated.

An object of the motorcycle battery carrying apparatus is to removably fit a plurality of motorcycle batteries.

Another object of the motorcycle battery carrying apparatus is to aid in transport of a motorcycle battery.

A further object of the motorcycle battery carrying apparatus is to aid in installation and removal of a motorcycle battery.

An added object of the motorcycle battery carrying apparatus is to use existing motorcycle battery connections for removably fitting the battery.

These together with additional objects, features and advantages of the improved motorcycle battery carrying apparatus will be readily apparent to those of ordinary skill in the art upon reading the following detailed description of presently preferred, but nonetheless illustrative, embodiments of the improved motorcycle battery carrying apparatus when taken in conjunction with the accompanying drawings.

In this respect, before explaining the current embodiments of the improved motorcycle battery carrying apparatus in detail, it is to be understood that the motorcycle battery carrying apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved motorcycle battery carrying apparatus. It is therefore important that the claims be regarded as including such equivalent constructions insofar as they do not depart from the spirit and scope of the motorcycle battery carrying apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 8 thereof, the principles and concepts of the motorcycle battery carrying apparatus generally designated by the reference number 10 will be described.

Figure 4:
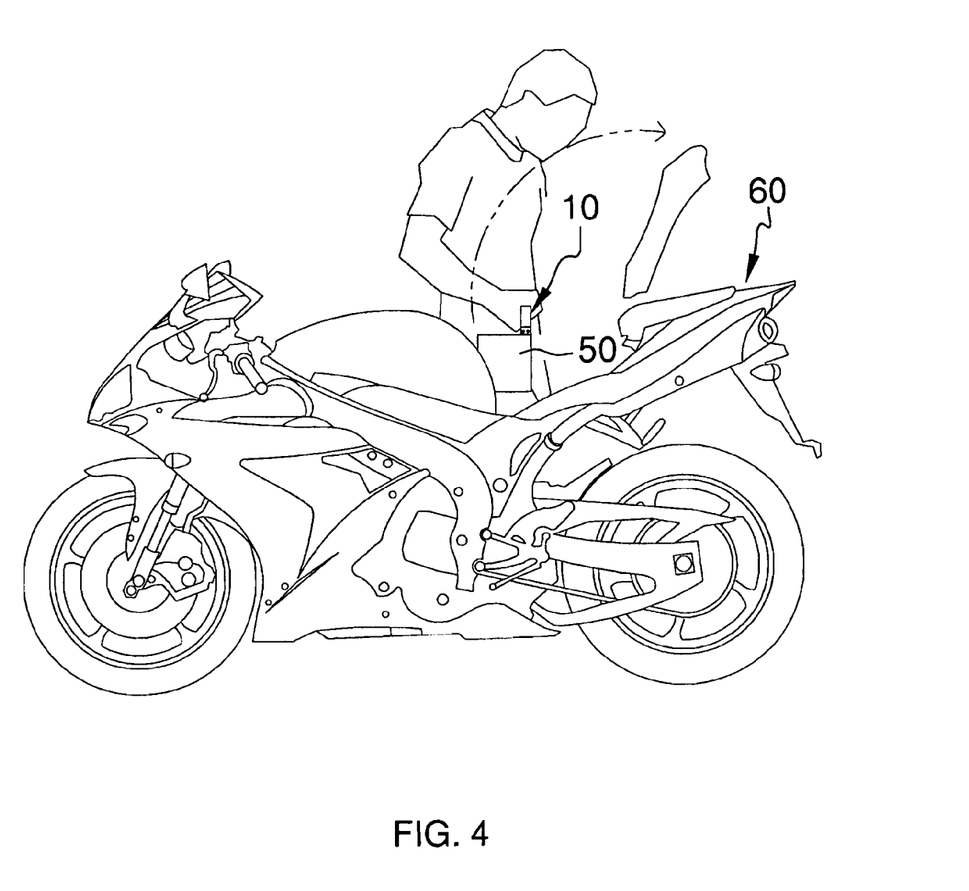
FIG. 4 is a lateral elevation view of the apparatus in use with a motorcycle battery.

Referring to FIG. 4, the motorcycle battery carrying apparatus 10 is useful in removing and installing a battery 50 from and into a motorcycle 60, respectively. The apparatus 10 is affixed to the battery 50 via the cable 56 mount bolts 58 that accompany such batteries 50 for hookup to the motorcycle 60.

Figure 1:
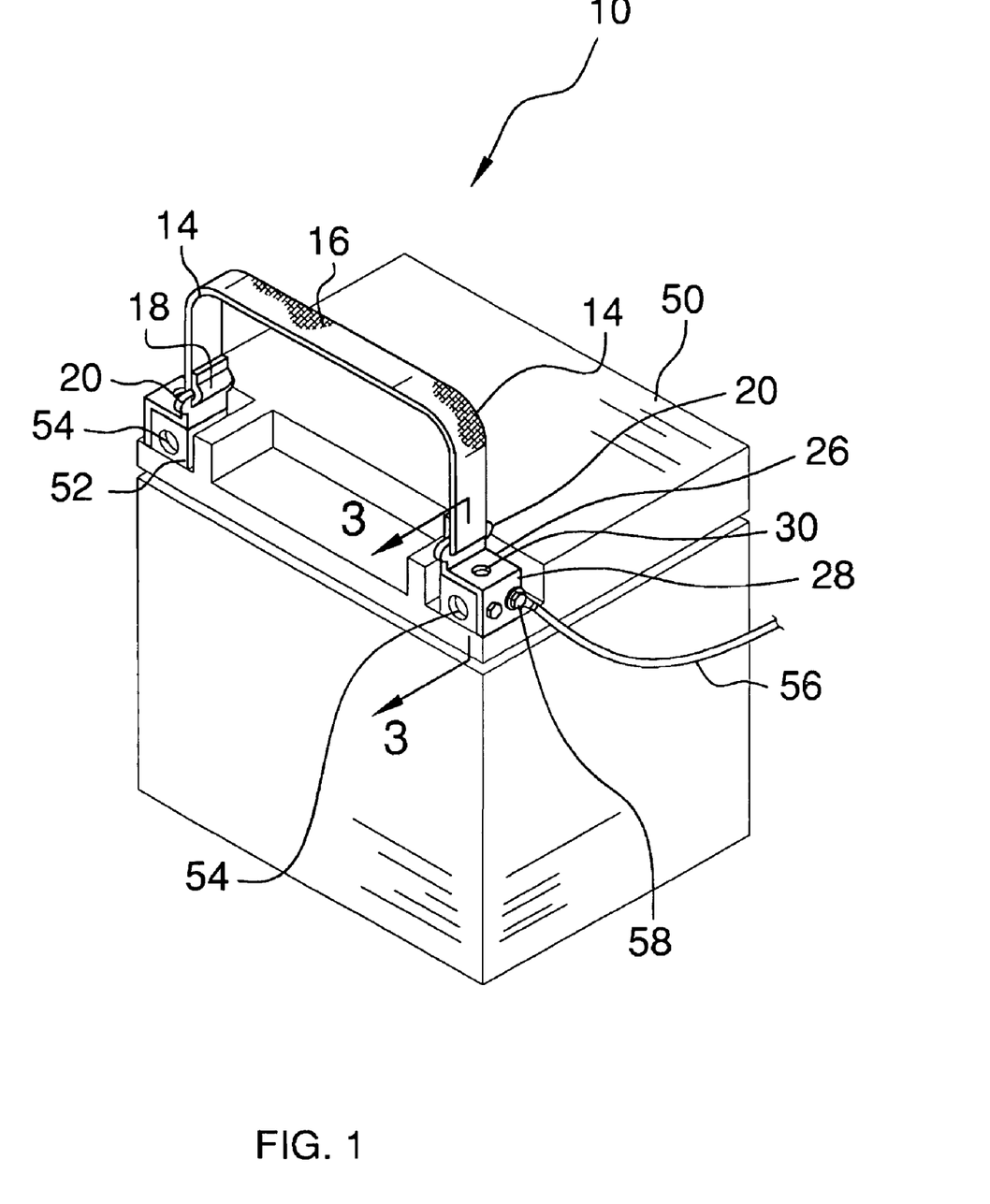
FIG. 1 is a perspective view of the apparatus fitted to a motorcycle battery.
Figure 2:
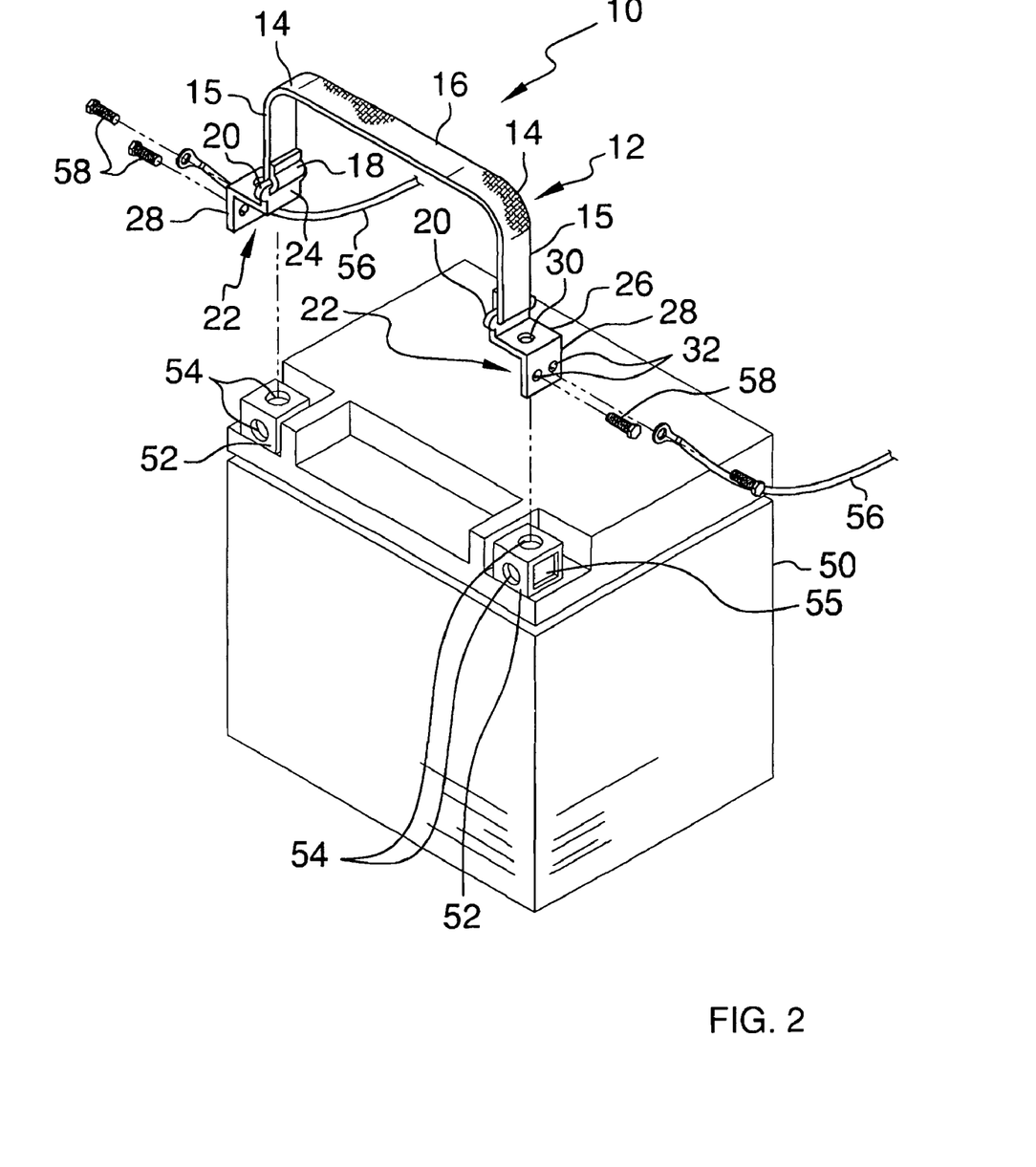
FIG. 2 is a perspective view of the apparatus in preparation of installation on a motorcycle battery.
Figure 3:
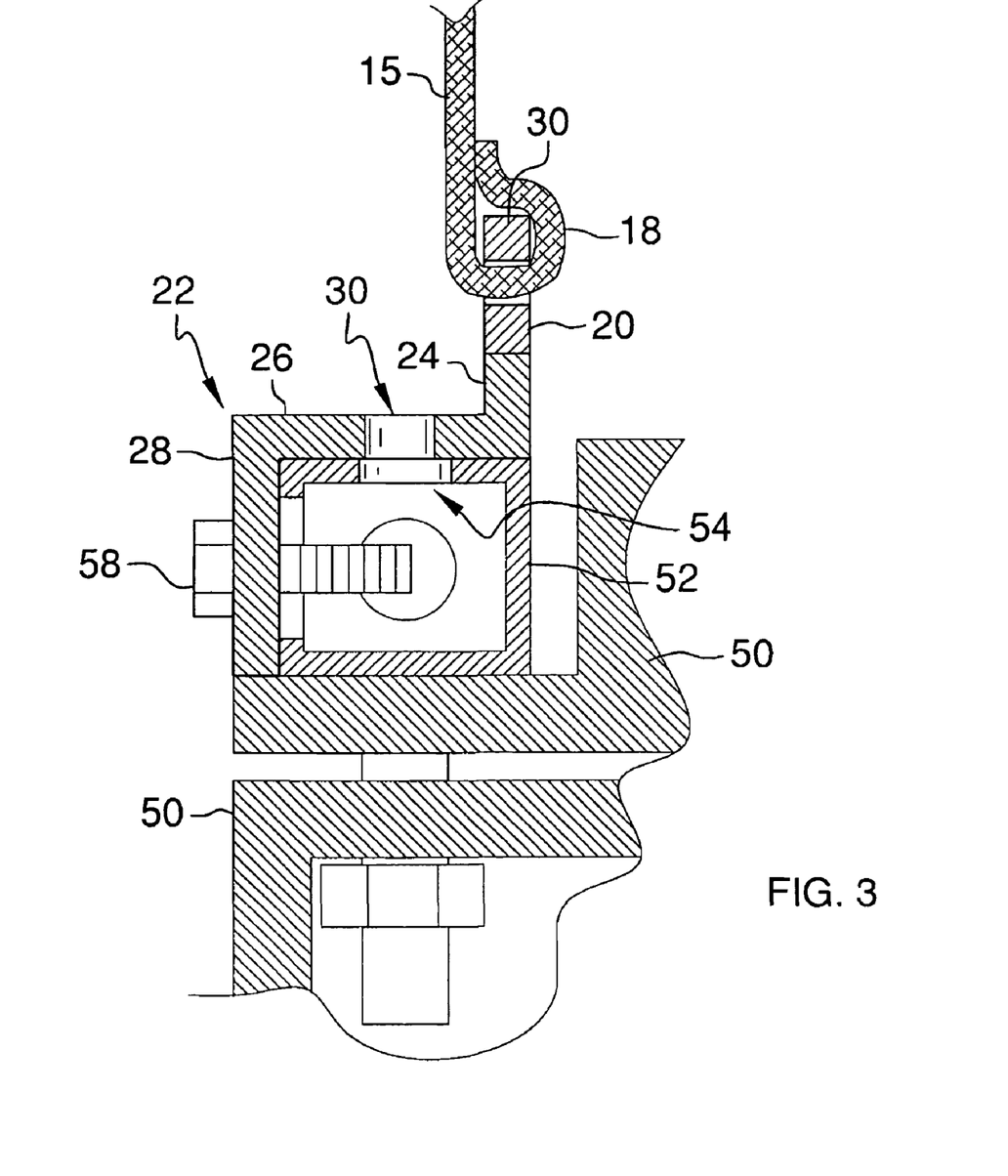
FIG. 3 is a cross sectional view one of the mount brackets of the apparatus fitted to a motorcycle battery.

Referring to FIGS. 1, 2, and 3, the apparatus partially comprises a strap 12. One embodiment of the apparatus 10 provides a pliable strap 12. The pliable strap 12 does not collapse upon itself, but instead, provides flexibility and forgiveness. The pliable strap 12 embodiment is useful in fitting a plurality of sizes of batteries 50 and in allowing a degree of flexibility in use. Further, some applications provide for the apparatus 10 to remain on the battery 50, as is shown. This is especially true with the pliable strap 12. The other embodiment of the strap 12 is rigid. The rigid strap 12 is also useful in various battery 50 removals and installation wherein no strap 12 flexibility aids in such. The strap 12 comprises a strap horizontal 16 having two opposite ends. A strap bend 14 is disposed at each end of the strap horizontal 16. A strap vertical 15 is affixed to each strap bend 14. A strap loop 18 is disposed at the end of each strap vertical 15. An oval ring 20 is pivotally contained within each strap loop 18. The oval rings 20 provide for a measure of forgiveness in fitting various batteries 50 and in working with the apparatus 10 in installing and removing batteries 50. A pair of mount brackets 22 is provided. Each mount bracket 22 comprises a bracket upright 24. Each bracket upright 24 is affixed to one of the oval rings 20 of the strap 12. A bracket horizontal 26 is affixed to each bracket upright 24. A bracket vertical 28 is affixed to each bracket horizontal 26. A horizontal hole 30 is disposed in each bracket horizontal. The horizontal hole 30 is not a directional identifier. The horizontal hole 30 defines the hole in the bracket horizontal 26. At least one threaded vertical hole 32 is disposed in each bracket vertical 28. The term vertical hole 32 is an identifier and does not indicate direction.

The mount brackets 22 enable attachment of the apparatus 10 to a motorcycle battery 50 using the battery's own battery terminals 52. Each motorcycle battery 50 terminal 52 comprises terminal foramens 54 and a terminal nut access 55. Batteries 50 are equipped with floating nuts (not shown) that removably fit through the nut access 55 of each terminal 52. A floating nut (not shown) is fitted through the nut access 55 of a terminal 52 and is faced upwardly. The nuts and mount bolts 58 are not part of the apparatus 10. A mount bolt 58 is affixed to the floating nut after being passed through the horizontal hole 30 of the mount bracket 22 of the apparatus 10. This mount bolt 58 is not shown. Selectively, the mount bolt 58 is also passed through the end of the battery cable 56. Optionally, as illustrated, an additional mount bolt 58 is passed through the cable 56 and into the threaded vertical hole 32 and thereby anchored to the apparatus 10. When the apparatus 10 is used only for installation and removal of the battery 50, the battery cable 56 is not attached to the apparatus 10. Therefore, each cable 56 can be selected to attach to one of the mount brackets 22, either through the horizontal hole 30 or via one of the vertical holes 32, or the apparatus 10 can be used to install the battery 50, then removed. In the latter case, the battery cable 56 is installed as the user prefers on the battery terminal 52.

Figure 5:
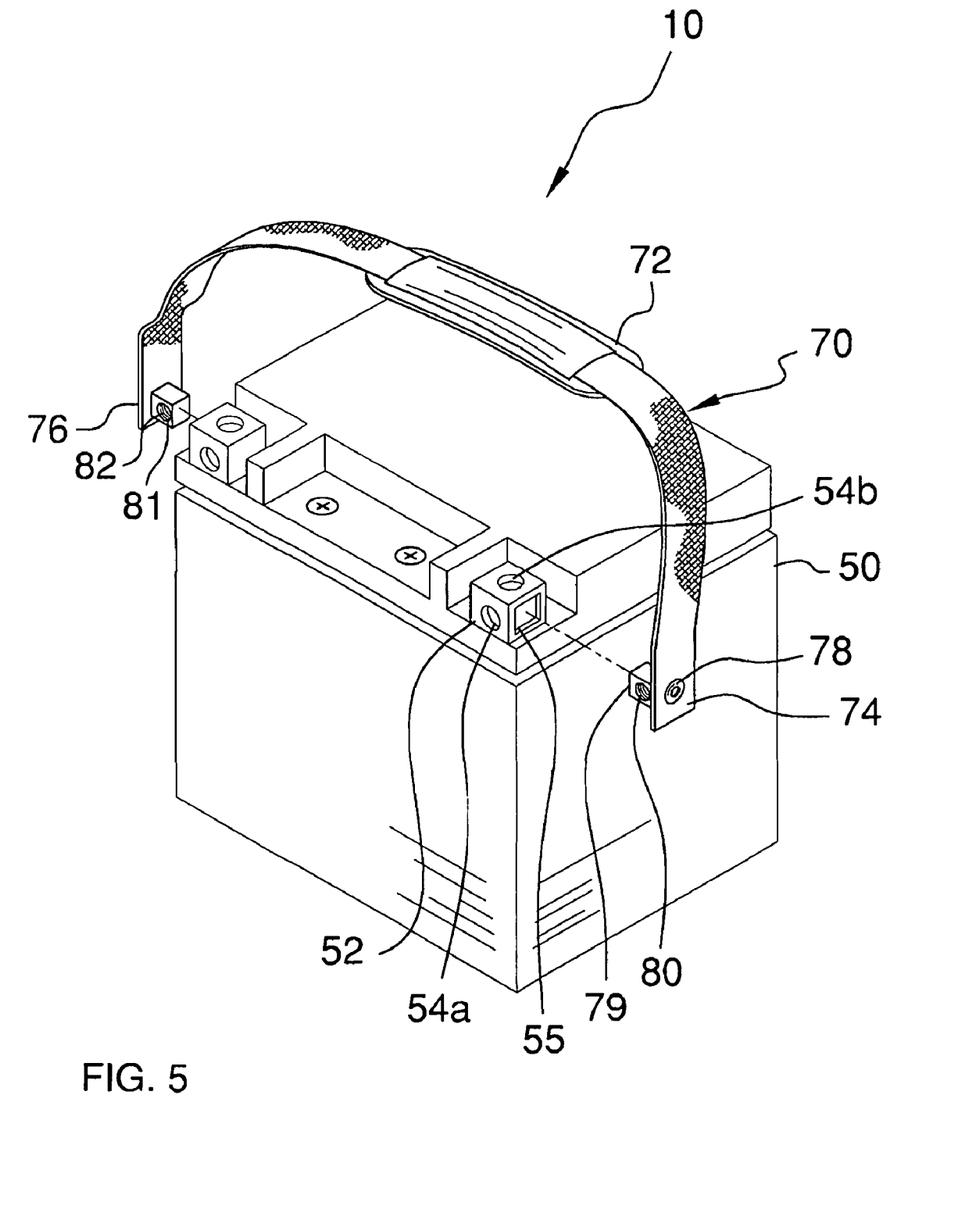
FIG. 5 is an exploded perspective view of an alternative embodiment providing a nylon handle.

Referring to FIG. 5, an alternative embodiment of the apparatus 10 is illustrated which partially comprises a nylon handle 70. The nylon handle 70 does not collapse upon itself, but instead, provides flexibility and forgiveness. The handle 70 has a reinforcement portion 72 which provides additional strength to the handle 70 for lifting the battery 50 to which it is attached and also keeps the handle 70 from hurting or cutting into the user's hands. The handle 70 has a grommet 76, 78 on its right lower portion 74 as well as on its left lower portion 76, respectively. The handle 70 further has a parallelepiped right mounting portion 79 and a parallelepiped left mounting portion 81, formed of metal or heavy duty plastic, each having a threaded circular aperture 80, 82 on front side. The handle 70 also fits a plurality of sizes of batteries 50 and in allowing a degree of flexibility in use. The handle 70 straps onto an existing battery 50 hardware by inserting a mounting portions 79, 80 into each of the battery's own battery terminals 52 nut terminal access 55 into position wherein the mounting portions 79, 80 are aligned with the terminal foramens 54a through which a floating nuts is removably inserted to affix the handle 70 to a motorcycle battery 50.

Figure 6:
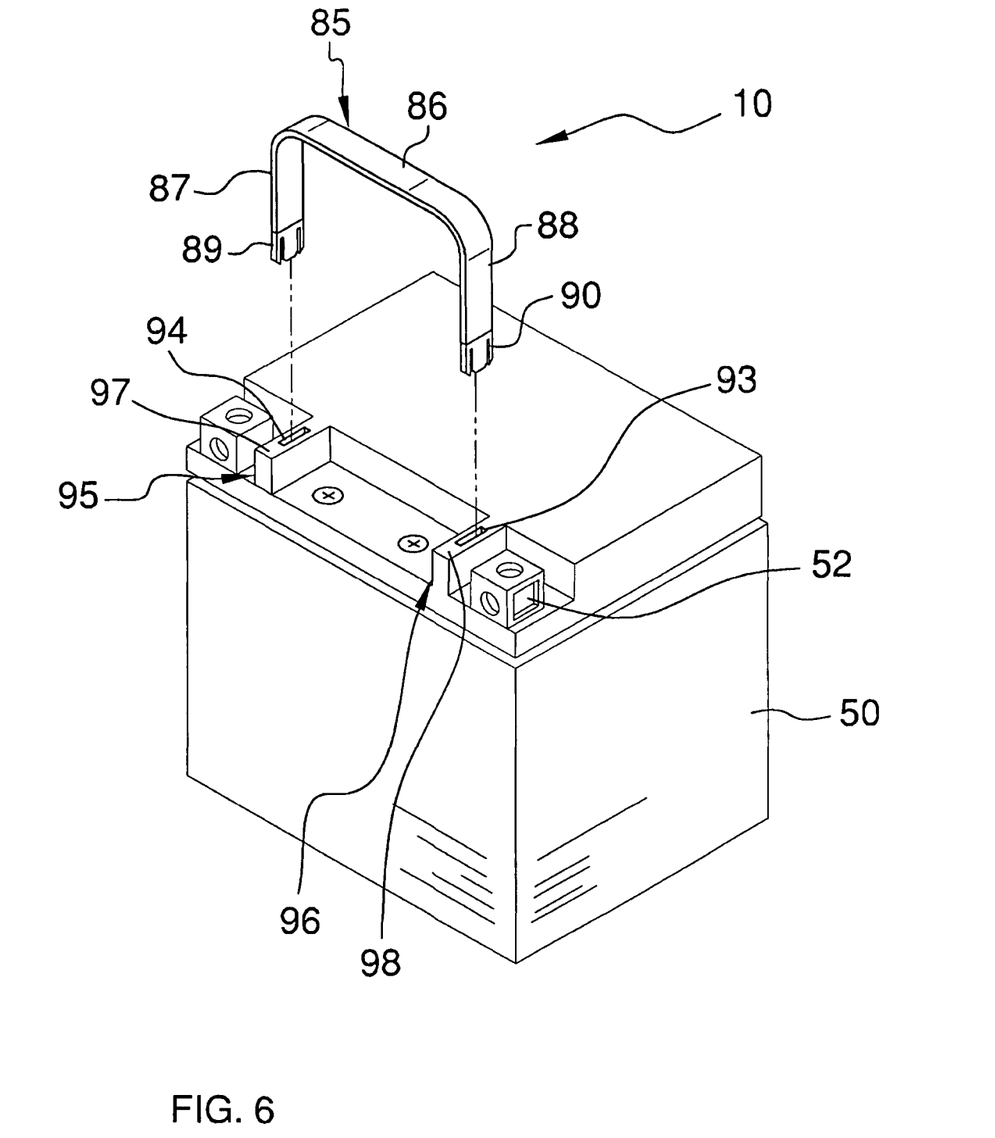
FIG. 6 is an exploded perspective view of another alternative embodiment providing a clip strap.

Referring to FIG. 6, another embodiment of the apparatus 10 is illustrated which partially comprises a clip strap 85. The clip strap 85 does not collapse upon itself and provides a rigid carrying attachment to a motorcycle battery 50. The clip strap 85 may be employed to install a plurality of sizes of batteries 50 and to remove various battery 50 where strap or handle flexibility does not aid in installation or removal. The clip strap 85 comprises a rigid, elongated center section 86, a rigid downwardly-turning left section 87 to the left side of the center section 86 and an opposite rigid downwardly-turning right section 88 to the right side of the center 86. A semi-rigid left clip 89 and a semi-rigid right clip 90 affixed to the left section 87 and right section 88, respectively, are removably secured inside a left receptacle cavity 94 and right receptacle cavity 93 in the top side 97, 98 of a left protrusion 95 and right protrusion 96, respectively. The left protrusion 95 and right protrusion 96 are positioned on the top of a battery 50 to the inside of each battery terminal 52.

Figure 7:
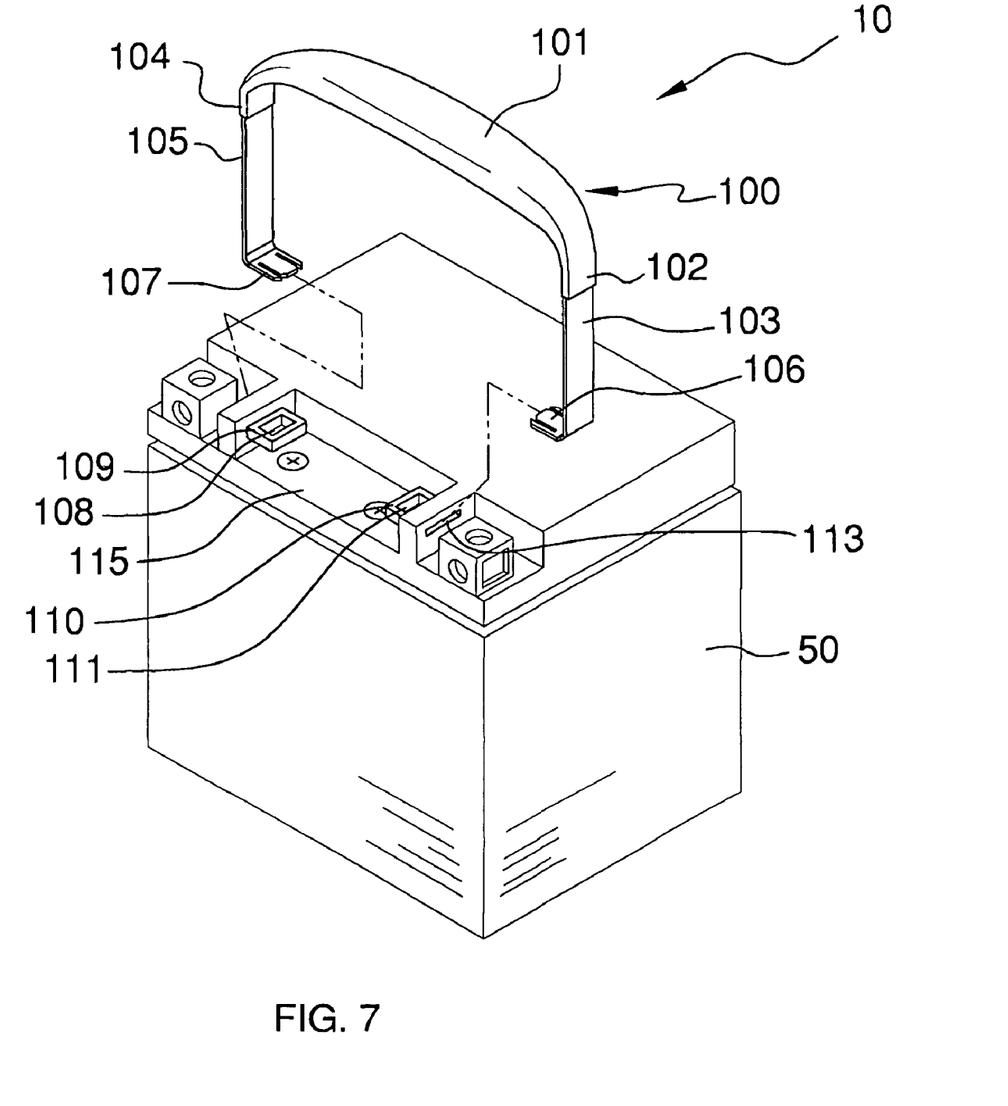
FIG. 7 is an exploded perspective view of still another alternative embodiment providing a side-clipping compact strap.
Figure 8:
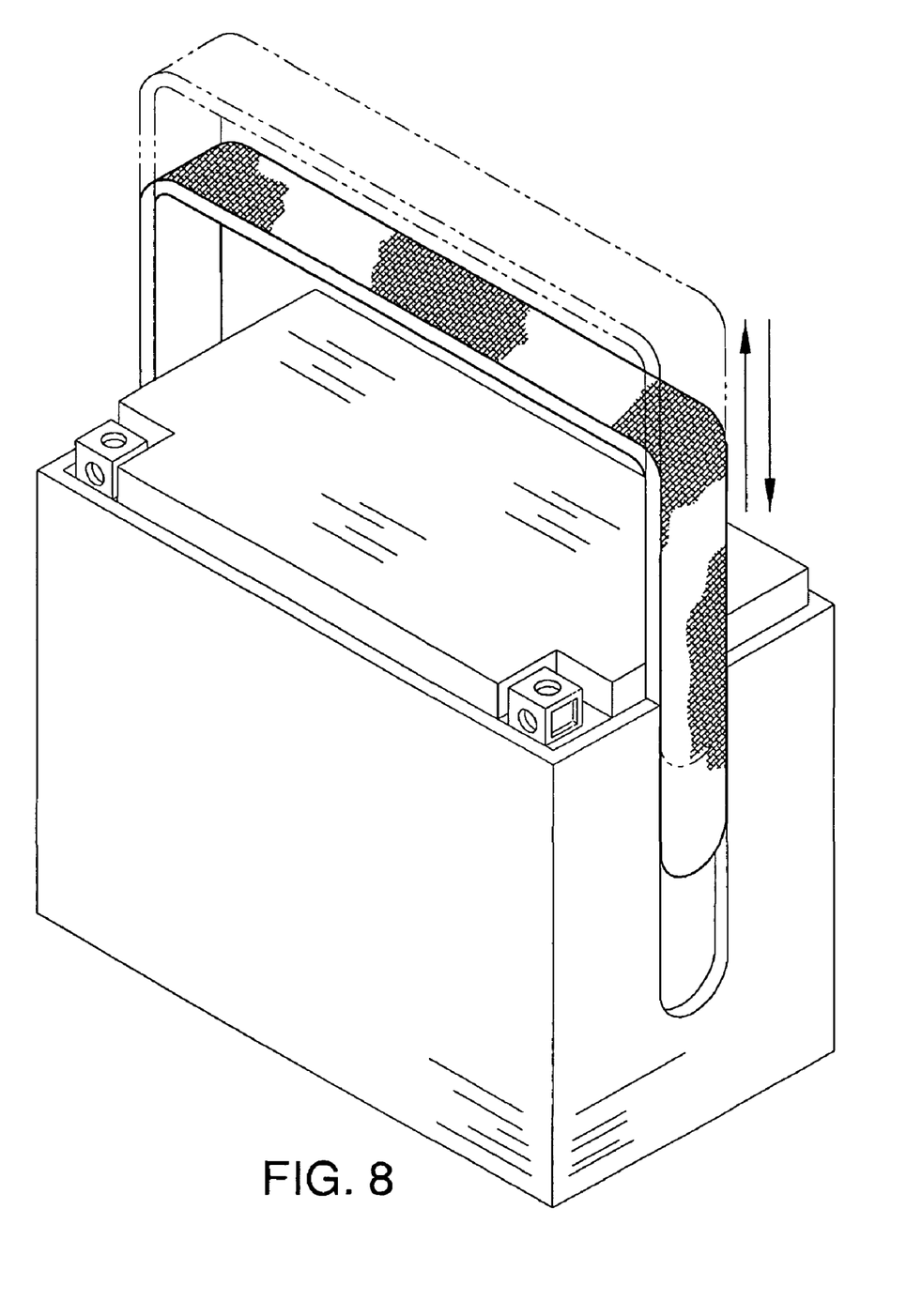
FIG. 8 is an exploded perspective view of yet another alternative embodiment providing a slidably contained handle.

Referring to FIG. 7, yet another embodiment of the apparatus is illustrated which partially comprises a side-clipping compact strap 100. The side-clipping compact strap 100 is also useful in various battery 50 removals and installation wherein no strap 12 flexibility aids in the removal or installation. The compact strap 100 comprises wide, elongated central portion 101 having a downwardly turning left end 104 and right end 102. To the left end 104 is attached a downwardly extending narrower left portion 105 and to the right end 102 is attached a downwardly extending narrower right portion 103. A semi-rigid clip attachment 106, 107 is perpendicularly attached to the right portion 103 and left portion 105, the right portion 103 and left portion 105 each extending inwardly to slidingly secure into an opening 113 in a left receptacle cavity 94 and right receptacle cavity 93 (shown in FIG. 6) in the interior sides 97, 98 of a left protrusion 95 and right protrusion 96, respectively and further into a clip receiver 109, 110, adjacent to the left protrusion 95 and right protrusion 96, respectively. Each clip receiver 109, 110 has a top opening 108, 111 wherein the clip attachment 106, 107 may be accessed for removal from the left protrusion 95 and right protrusion 96, respectively.

With respect to the above description then, it is to be realized that the optimum dimensional relationships for the parts of the motorcycle battery carrying apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the motorcycle battery carrying apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the motorcycle battery carrying apparatus may be used.

Therefore, the foregoing is considered as illustrative only of the principles of the motorcycle battery carrying apparatus. Further, since numerous modifications and changes will readily occur to those skilled in the art, it is not desired to limit the motorcycle battery carrying apparatus to the exact construction and operation shown and described, and accordingly, all suitable modifications and equivalents may be resorted to, falling within the scope of the motorcycle battery carrying apparatus.

What is claimed is:

1. A motorcycle battery carrying apparatus, comprising:
   a strap having two opposite ends, the strap further comprising:
      a pair of mount brackets, each mount bracket comprising:
         a bracket upright, each bracket upright affixed to one of the opposite ends of the strap;
         a bracket horizontal affixed to each bracket upright;
         a bracket vertical affixed to each bracket horizontal;
         a horizontal hole in each bracket horizontal;
         at least one threaded vertical hole in each bracket vertical.

2. The apparatus according to claim 1 further comprising more than one vertical hole in each bracket vertical.

3. The apparatus according to claim 2 further comprising a strap loop at each strap end;
   an oval ring pivotally contained within each strap loop;
   each bracket upright affixed to one of the oval loops.

4. The apparatus according to claim 3 wherein the strap further comprises a strap horizontal;
   a strap bend at each end of the strap horizontal;
   a strap vertical affixed to each strap bend;
   each strap loop affixed to one of the strap verticals.

5. The apparatus according to claim 2 wherein the strap further comprises a strap horizontal;
   a strap bend at each end of the strap horizontal;
   a strap vertical affixed to each strap bend;
   a strap loop affixed to each of the strap verticals.

6. The apparatus according to claim 1 further comprising a strap loop at each strap end;
   an oval ring pivotally contained within each strap loop;
   each bracket upright affixed to one of the oval loops.

7. The apparatus according to claim 6 wherein the strap further comprises a strap horizontal;
   a strap bend at each end of the strap horizontal;
   a strap vertical affixed to each strap bend;
   each strap loop affixed to one of the strap verticals.

8. The apparatus according to claim 1 wherein the strap further comprises a strap horizontal;
   a strap bend at each end of the strap horizontal;
   a strap vertical affixed to each strap bend;
   a strap loop affixed to each of the strap verticals.

9. A motorcycle battery carrying apparatus, comprising:
   a rigid strap having two opposite ends, the strap further comprising:
      a pair of mount brackets, each mount bracket comprising:
         a bracket upright, each bracket upright affixed to one of the opposite ends of the strap;
         a bracket horizontal affixed to each bracket upright;
         a bracket vertical affixed to each bracket horizontal;
         a horizontal hole in each bracket horizontal;
         at least one threaded vertical hole in each bracket vertical.

10. The apparatus according to claim 9 further comprising more than one vertical hole in each bracket vertical.

11. The apparatus according to claim 10 further comprising a strap loop at each strap end;
    an oval ring pivotally contained within each strap loop;
    each bracket upright affixed to one of the oval loops.

12. The apparatus according to claim 11 wherein the strap further comprises a strap horizontal;
    a strap bend at each end of the strap horizontal;
    a strap vertical affixed to each strap bend;
    each strap loop affixed to one of the strap verticals.

13. The apparatus according to claim 10 wherein the strap further comprises a strap horizontal;
    a strap bend at each end of the strap horizontal;
    a strap vertical affixed to each strap bend;
    a strap loop affixed to each of the strap verticals.

14. The apparatus according to claim 9 further comprising a strap loop at each strap end;
    an oval ring pivotally contained within each strap loop;
    each bracket upright affixed to one of the oval loops.

15. The apparatus according to claim 14 wherein the strap further comprises a strap horizontal;
    a strap bend at each end of the strap horizontal;
    a strap vertical affixed to each strap bend;
    each strap loop affixed to one of the strap verticals.

16. The apparatus according to claim 9 wherein the strap further comprises a strap horizontal;
    a strap bend at each end of the strap horizontal;
    a strap vertical affixed to each strap bend;
    a strap loop affixed to each of the strap verticals.

17. A motorcycle battery carrying apparatus, comprising:
    a pliable strap having two opposite ends, the strap further comprising:
       a strap horizontal;
       a strap bend at each end of the strap horizontal;
       a strap vertical affixed to each strap bend;

a strap loop at an end of each strap vertical;
an oval ring pivotally contained within each strap loop;
a pair of mount brackets, each mount bracket comprising:
 a bracket upright, each bracket upright affixed to one of the oval rings of the strap;
 a bracket horizontal affixed to each bracket upright;
 a bracket vertical affixed to each bracket horizontal;
 a horizontal hole in each bracket horizontal;
 at least one threaded vertical hole in each bracket vertical.

* * * * *